SYSTEM FOR RECORDING AND REPRODUCING SIGNAL WAVES

Filed Aug. 26, 1953 6 Sheets-Sheet 1

INVENTOR.
Hans B. Belck

BY [signature]
his attorney

INVENTOR.
Hans B. Belck
BY
Gilbert Wolf
his Attorney

INVENTOR.
Hans B. Belck
BY
Elliott [signature]
his Attorney

Aug. 23, 1960 H. B. BELCK 2,950,352

SYSTEM FOR RECORDING AND REPRODUCING SIGNAL WAVES

Filed Aug. 26, 1953 6 Sheets-Sheet 4

INVENTOR.
Hans B. Belck

BY

Ezekiel Wolf
his Attorney

Aug. 23, 1960 H. B. BELCK 2,950,352

SYSTEM FOR RECORDING AND REPRODUCING SIGNAL WAVES

Filed Aug. 26, 1953 6 Sheets-Sheet 5

INVENTOR.
Hans B. Belck

BY

[signature]
his Attorney

INVENTOR.
Hans B. Belck
BY
[signature]
his Attorney

United States Patent Office 2,950,352

Patented Aug. 23, 1960

2,950,352

SYSTEM FOR RECORDING AND REPRODUCING SIGNAL WAVES

Hans B. Belck, Troy, N.Y., assignor to Rensselaer Polytechnic Institute, Troy, N.Y., a corporation of New York Filed Aug. 26, 1953, Ser. No. 376,689

15 Claims. (Cl. 179—100.2)

The present invention relates to recording and reproducing signal waves, more particularly to recording and reproducing in which a magnetic tape recorder may be used to record signals containing frequencies from zero or D.C. to several thousand cycles per second with an unusual accuracy up to about one-tenth of one percent full scale. Some typical applications of the present invention are in the following fields:

Any kind of low frequency analog computing.

Recording of seismic signals.

Recording of brain waves and related applications in the medical and physiological field.

In the prior art of magnetic recording, the following means have been used:

(*a*) *Amplitude modulation.*—This allows the recording of higher frequencies but is much too inaccurate for the applications contemplated, e.g. in conjunction with electronic analog computers. It also lacks the possibility of recording D.C. signals and signals of extremely low frequencies of the order of tenths of cycles per second.

(*b*) *Frequency modulation.*—Although the accuracy of frequency modulation is better than in amplitude modulation and although D.C. signals can be recorded, the achieved accuracy of about one percent full scale is still insufficient for applications in the high accuracy analog computor field. In addition, the zero level of the reproduced signal depends critically on the center frequency of the demodulator circuit and on the tape speed. Resulting errors can be eliminated only by the use of elaborate compensation circuits.

(*c*) *Pulse width modulation and pulse height modulation.*—Pulse height modulation has shortcomings similar to those of amplitude modulation although to a lesser degree. Similarly, pulse width modulation has disadvantages similar to those encountered in frequency modulation.

(*d*) *Pulse code modulation.*—This is perhaps the most accurate existing method of recording signals. However, the circuits necessary for a pulse code modulated recorder are complicated and costly. In spite of that, the accuracy attainable with a pulse code type recorder is still limited to the accuracy of the necessary analog-to-digital and digital-to-analog converters which will hardly exceed the order of one-tenth of a percent full scale.

*Advantages of invention*

The method of recording which is the content of this inveniton is to use what might be called "pulse time ratio modulation." The signal to be recorded is first converted into a succession of sharply defined pulses such that the ratio of the times between two successive pulses is a function of the signal amplitude. These sharp pulses are then recorded on magnetic tape. If the magnetic tape is played back, the same series of pulses is obtained and the original signal can be constructed from these pulses. The following advantages result from this method of recording:

The accuracy is unusually high, because the information recorded is nothing but the relative location of sharp pulses on the tape. This information is highly independent of the recording characteristics of the magnetic tape, the magnetic recording head and any preamplifiers used. Moreover, since only the ratio of successive intervals determines the signal strength, the amplitude of the reproduction is independent of the playback speed over a very large range. This eliminates the necessity of elaborate speed controls in many applications. It results in a high signal to noise ratio. Noise caused by flutter and wow is very low, such that inexpensive recording mechanisms will yield essentially the same high accuracy. Additionally, a signal can be recorded at one speend and played back immediately without any readjustments at an entirely different speed up to many times faster or slower than the speed of recording. Another feature consists of the possibility to electronically multiply the output signal of the recorder with any other sufficiently slowly varying signal with a degree of accuracy of the same order. Only a small amount of additional circuitry is required for this multiplication. This feature is very important in the application of this recorder for statistical analysis, Fourier analysis, expansion of arbitrary functions in a series of orthogonal functions, solution of non-linear, ordinary and partial differential equations. The combined features of this recorder allow a new approach to the solution of partial differential equations on electronic analog computers such as the REAC which ordinarily can be used only for the solution of ordinary differential equations. In contrast to existing special purpose analog computers for the solution of partial differential equations, the achieved accuracy and the diversity of problems solvable by this method is very high.

Other and further advantages of the present invention will be best understood from the description of the invention in the specification set forth below when taken in connection with the drawing illustrating an emobdiment thereof, in which:

Figure 1 represents a block diagram of the system.

Figures 2 and 2*a* show certain wave forms and curves of units of the circuit.

Figure 8:
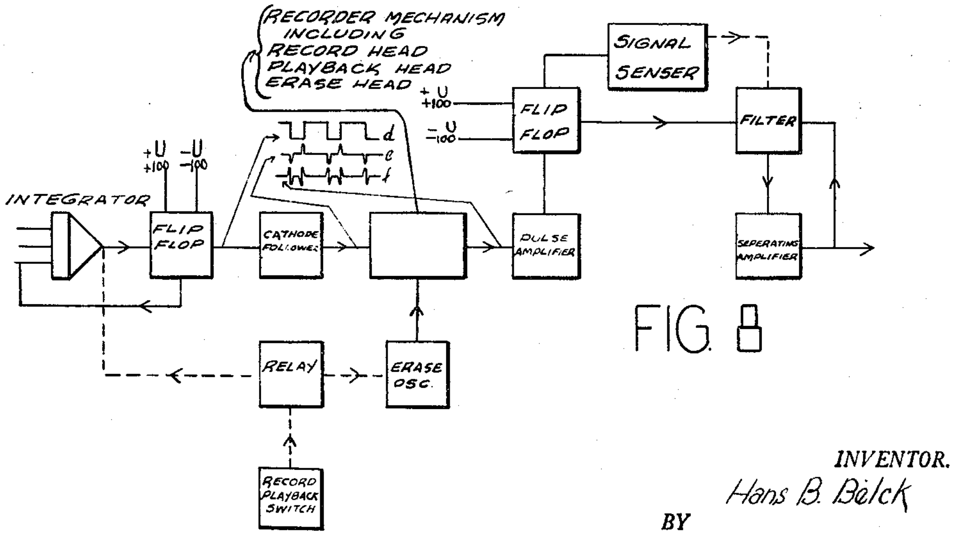
Figure 8 shows a more complete block diagram than shown in Figure 1, illustrating more completely the elements following the recorder of Figure 1.
Figure 8A:
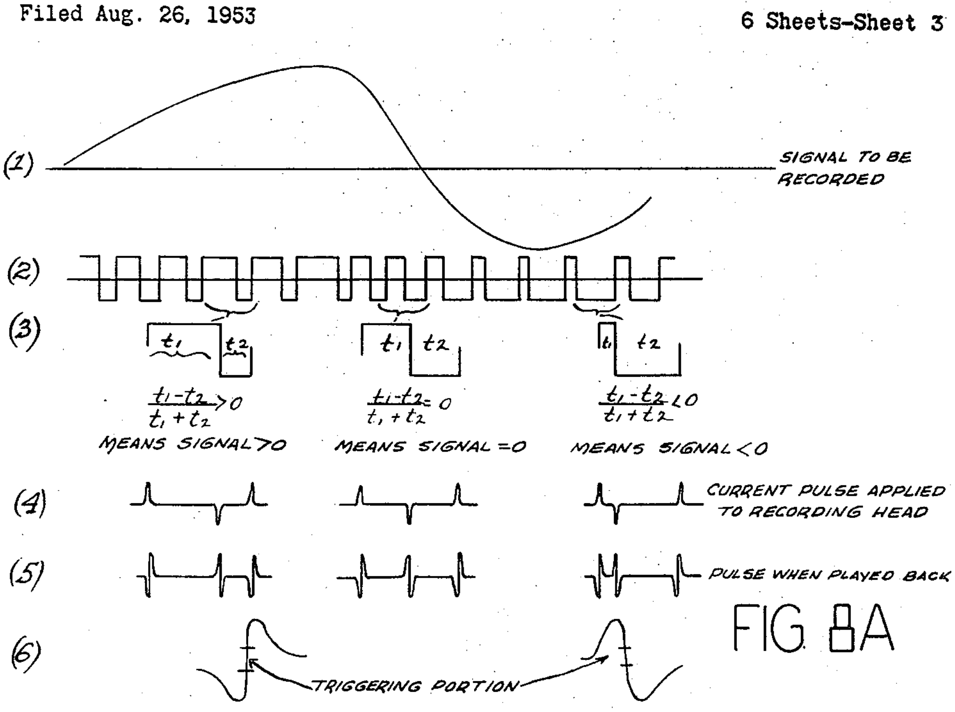

Figure 8*a* is a set of curves illustrating the transformations of the original signal and its recompositions in the type of modulations of the present invention.

Figure 9:
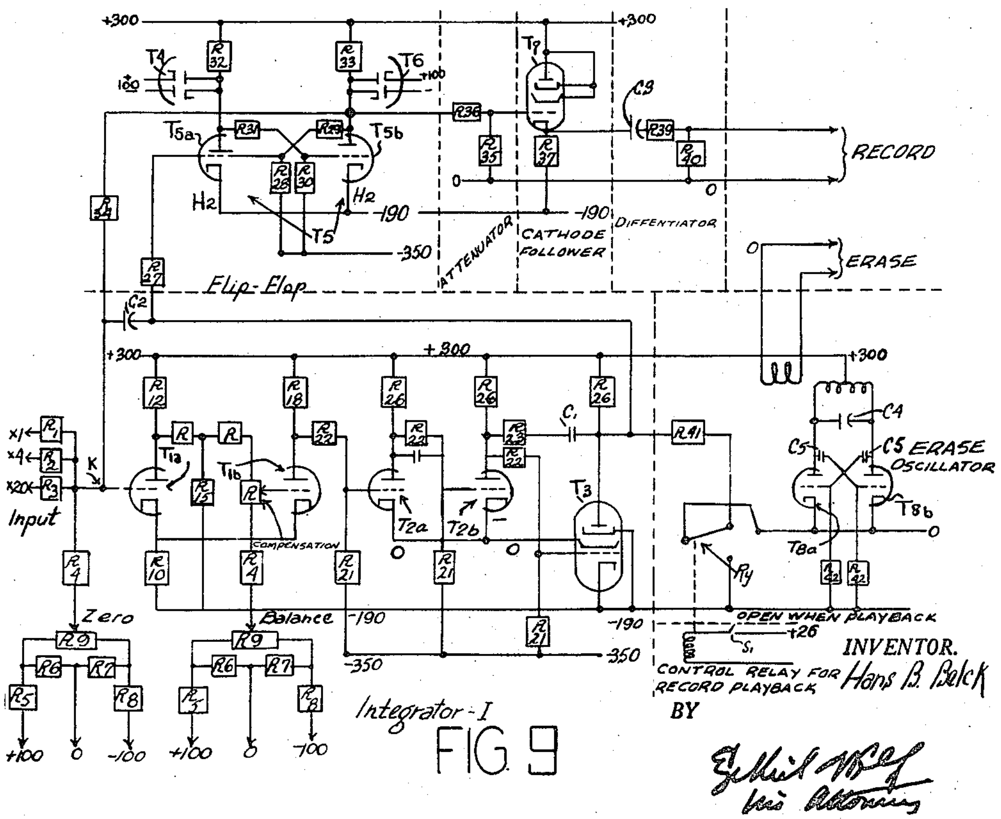
Figure 10:
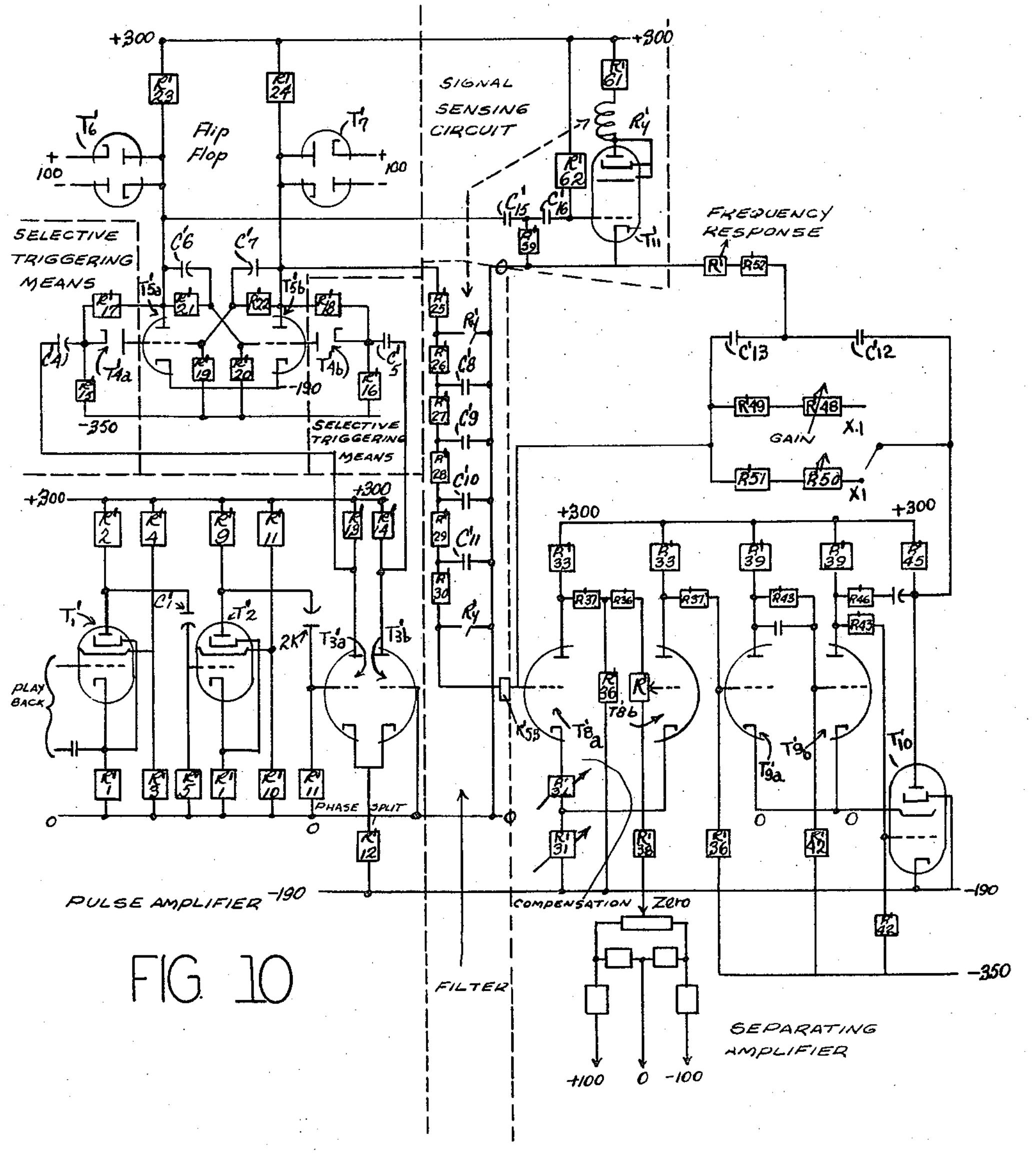

Figures 9 and 10 show respectively circuit diagrams to the recorder and from the recorder to the means wherein the reconstructed wave form is produced.

Figure 10A:
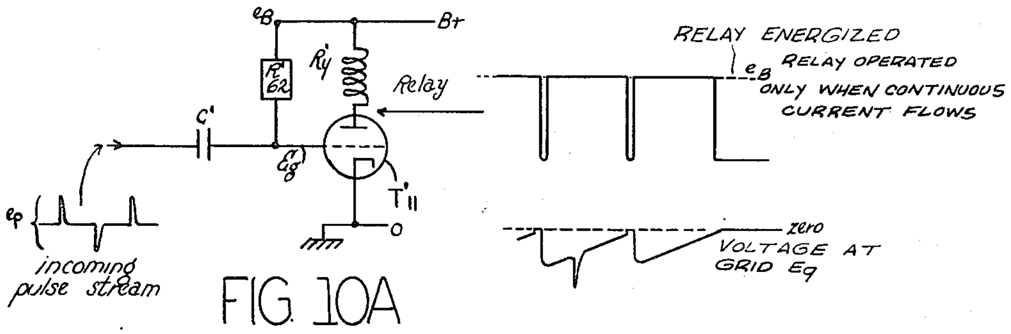

Figure 10*a* shows details of the signal sensing circuit.

Figure 10B:
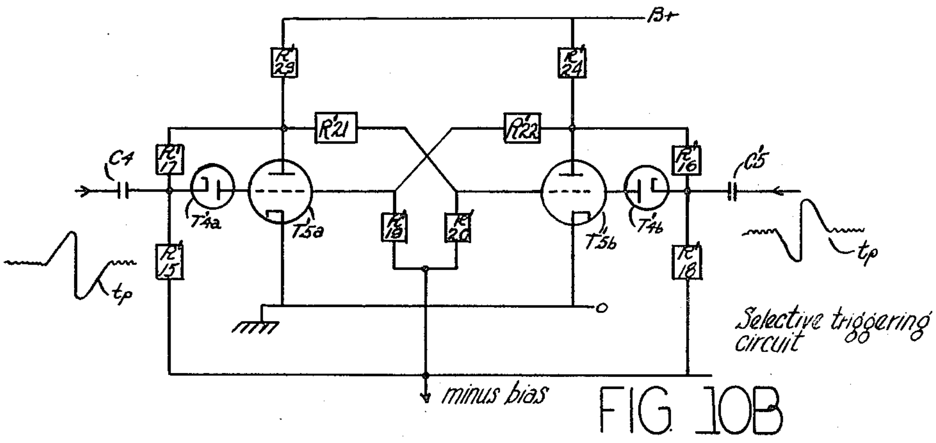
Figure 10C:
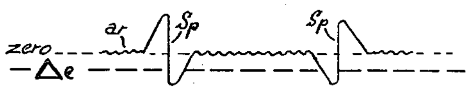
Figure 10D:
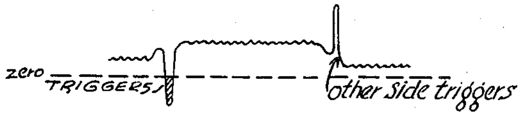
Figure 10E:
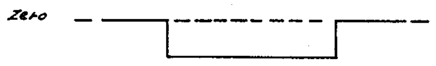

Figure 10*b* shows the selective triggering circuit and Figures 10*c*, 10*d* and 10*e* show curves relating to it.

Figure 11:
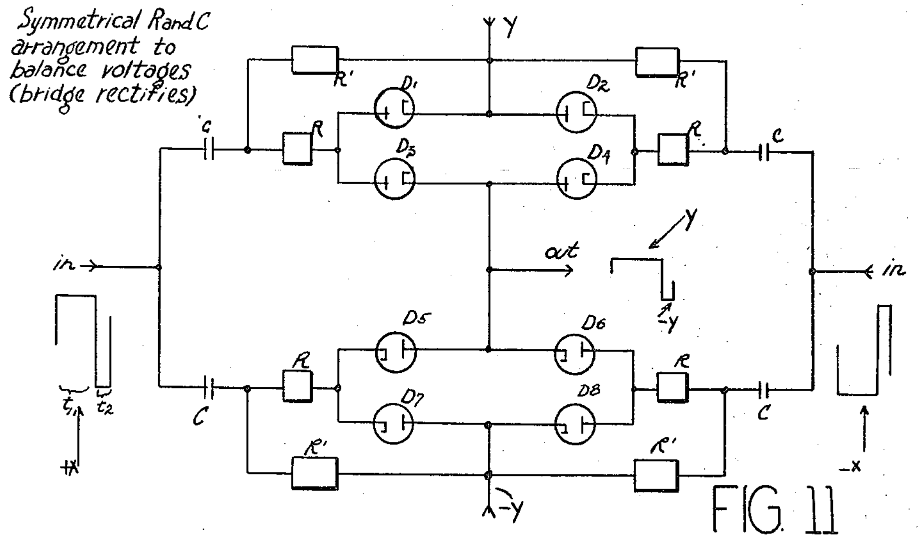

Figure 11 shows a multiplier gate circuit.

Figure 12:
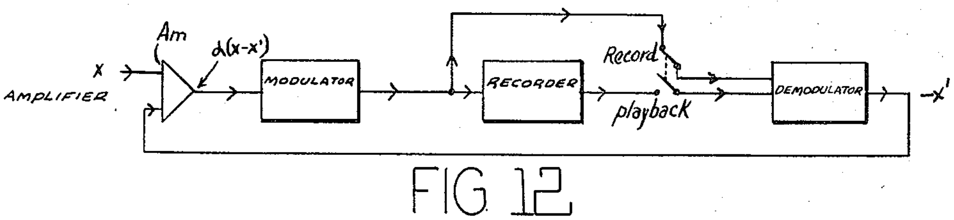

Figure 12 shows a feed back recorder detail.

Figure 1:
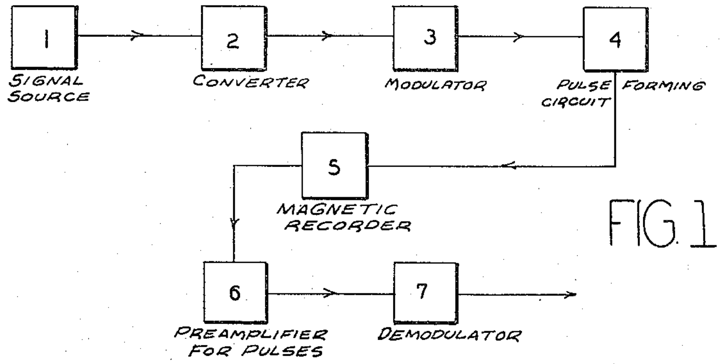
Figure 13:
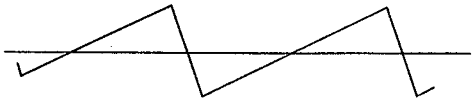
Figure 13A:
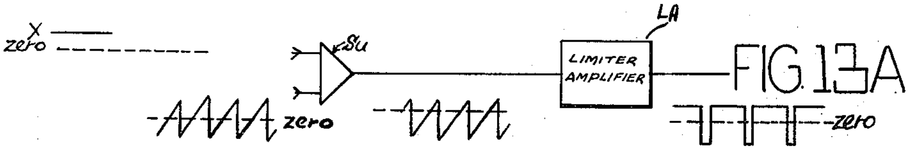
Figure 13B:
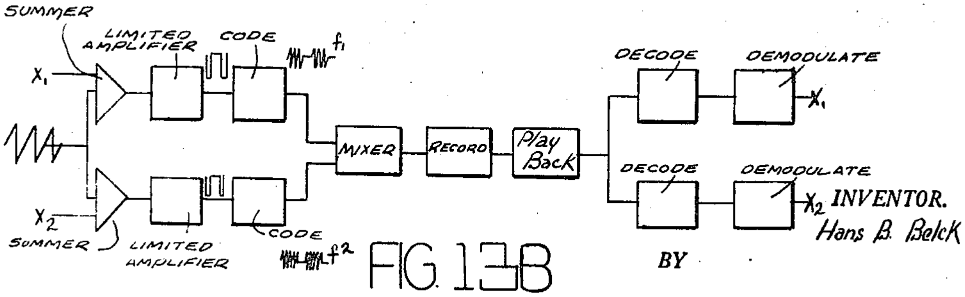

Figures 13, 13*a* and 13*b* show a wave form and modification of the circuit of Figure 1.

*General description of invention*

The output of the signal source 1, Figure 1, is modified by some converter or transducer 2 into a voltage wave of suitable amplitude for the modulator circuit 3 which follows 2. In most instances, the signal from the signal source 1 will already be in the form of a voltage wave. Then 2 would be either an amplifier or an attenuator. It is also possible to incorporate 2 in the modulator circuit 3 as will be illustrated.

Figure 2:
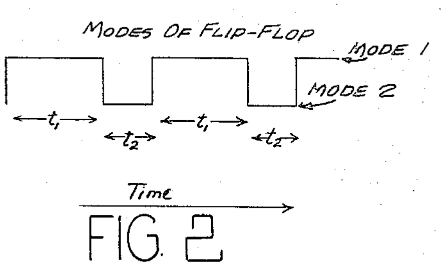

The modulator circuit 3 transforms the input signal of 3 into a signal which changes abruptly from one mode to another, see Figure 2, such that successive time intervals defined by these abrupt changes of mode bear the following functional relation to the input signal (see Figure 2):

$$\frac{X}{U}=\frac{t_1-t_2}{t_1+t_2}$$

where U is "unity"-voltage, and arbitrarily fixed voltage (e.g. 100 volts) which is used as reference; and X is the amplitude of the signal output.

This relation holds accurately only for a constant input signal. For a signal that changes with time a more correct formula is:

$$\frac{X(\tau)}{U}=\frac{t_1-t_2}{t_1+t_2}$$

where $\tau$ lies somewhere in the interval $t_1+t_2$.

The output signal of the modulator 3 is now fed through a pulse forming circuit 4. This circuit derives short sharply defined pulses from the output signal of 3, which as was explained above, has abrupt changes between two modes.

The pulses thus produced at the output of 4 are now recorded on the magnetic tape of recorder 5. The method of recording is of secondary importance, although one should strive to utilize a method which is particularly well suited to record very narrow (in space dimension) pulses on the magnetic tape.

In some applications, e.g. recording signals containing frequency components of several thousand cycles per second, it might be advantageous to dispense with the pulse forming circuit 4 and record directly the mode changes occurring at the output of 3.

In order to reproduce the original voltage signal which existed at the input of 3 during the recording process, one plays back the magnetic record of the pulses. This playback may take place at the original tape speed, or at a speed higher or lower than the original speed. In any event, the ratio of successive time intervals as bounded by the reproduced pulses is the same as during the original recording, and this ratio defines the signal amplitude at a time within the time interval in question. The remaining portion of the reproducing circuit is a device which actually synthesizes this signal voltage by utilizing the pulses from the output of the recorder 5. If a preamplifier is not incorporated in the recording device, or if the existing preamplifier does not have suitable amplification characteristics for the purpose at hand (see further details below) it is generally necessary to precede the actual demodulator circuit 7 by a suitable preamplifier circuit 6. This amplifier must not of necessity be an electronic amplifier. A pulse transformer or similar device can conceivably perform the same function. The preamplifier might also be embodied into the demodulator circuit 7 itself.

The demodulator circuit 7 now generates the original signal or a function of the original signal such as a multiple, a fraction, or the product of the original signal with some other signal available at the time of reproduction, or a function (in the mathematical sense) of the original signal amplitude, making use of the time relationship between the pulses delivered by the preamplifier 6. The demodulator circuit will generally include a more or less elaborate filter circuit to eliminate what might be called the "sampling noise." This sampling noise has a fundamental frequency which is equal to ½ the number of pulses per second at the output of the preamplifier 6. This pulse frequency will usually be sufficiently above the upper frequency limit of the signal that it is not too difficult to suppress this kind of noise below a suitable level.

As already pointed out, the kind of modulation used in this recording scheme has several advantages over other recording methods in regard to obtainable accuracy, signal to noise ratio, freedom from noise due to low and high frequency flutter and wow, and usefulness of the representation of the signal in this pulse modulation for purposes such as immediate high-accuracy electronic multiplication. If one tries to evaluate the accuracy of a recording system, one will be led to the conclusion that the obtainable accuracy depends on the "modulation ratio." This modulation ratio might be defined as the ratio of the degree of modulation actually used over the degree of modulation conceivably (though not necessarily practically) possible. In frequency modulation, for example, the deviation in frequency from the center frequency (the actual degree of modulation) divided by the center frequency (the conceivable degree of modulation) is rarely ever higher than a few percent. In this pulse time ratio modulation, wherein the actual degree of modulation measured by the ratio $(t_1-t_2)/(t_1+t_2)$ can easily be made to range between −½ and ½, whereas the conceivable degree of modulation can only extend from −1 to 1, it is clear that the modulation ratio is of the order of 50%. In addition, it is possible to demodulate linearly, without any particular precautions, modulation ratios even as high as 70%. This stands in clear contrast to frequency modulation, where the characteristics of ordinarily used demodulator circuits are linear only in a fairly restricted range which forces one to work with a low modulation ratio if linearity is essential.

A simple calculation now suffices to estimate the possible accuracy of the method in a particular model actually built: The modulator, using high gain feedback circuits and fast acting "flip-flop" circuits is capable of an accuracy of the order of ¹⁄₁₀₀ of 1% depending on the quality of the components used. Similarly, the demodulator circuit consisting of the same kind of fast acting flip-flop circuits and high gain feedback circuits can be made to have substantially the same accuracy. The recording and reproducing accuracy depends only on the narrowness of the recording gap width in relation to the separation of consecutive pulses on the tape. The error which might possibly be introduced by this can be shown to be of the order of only ¹⁄₁₀ of one percent, in a typical case of a low frequency signal recorder. Even so, the kind of error introduced is rather of the nature of a fluctuating noise than an actual non-linearity of reproduction. A carefully designed recording and playback circuit arrangement might, therefore, reproduce with an accuracy of better than one tenth of one percent. In fact, the simple model built, for the purpose of laboratory testing, which can be said to use only components of average quality, and especially in regard to the recording mechanism utilized a machine of the most inexpensive popular design, even this simple model exhibited an accuracy, stability, and linearity definitely within + or −¹⁄₁₀ of one percent.

The signal to noise ratio can be shown to be high for the following reasons: Any high frequency components of the noise which exist at the output of the demodulator will be completely eliminated by the filters included in the demodulator circuit 7. The only kind of objectionable noise would, therefore, be of a low frequency. This low frequency noise now can either originate in the electronic circuitry, such as the modulator or the demodulator, or it can originate from wow and flutter-modulation of the pulse stream picked up by the playback head. The first kind of low frequency noise can be reduced to a very low level by careful design of the electronic circuits in question. Except for "drift" (which could be eliminated by known methods), the low frequency noise caused by these circuits alone was found to be completely unimportant in the experimental circuit built. The only detectable low frequency noise originated from the above mentioned wow and flutter modulation, but it was possible to reduce the noise to a level of lower than ¹⁄₂₀ of one percent peak to peak value. The reason is that the noise due to mechanical modulation can be shown to be independent of the velocity, but dependent only on the acceleration of the tape motion. And since only low frequency components of the tape speed variation can be of disadvantageous consequence as shown above, and since naturally the low frequency acceleration magnitude will be very small for any mechanism which is acceptable for but the lowest demands on quality, it follows that ordinarily wow and flutter modulation will be of negligible importance. A qualitative mathematical analysis shows just this behavior and this analysis is supported by actual tests with mechanisms wherein the wow and flutter is artificially produced and controlled.

Another useful feature of the recorder is that it is possible with the addition of but a simple circuit to multiply immediately electronically the output signal with some other signal which is available at the time of reproduction. This is so, because one only has to replace the "unity"-voltage delivered to the demodulator as a measure from which the final signal output is constructed, by any other suitable voltage source which may be time variant. The demodulator circuit in this arrangement has some similiarity to other circuits like the electronic multiplier used in analog computing. However, there are important differences, especially in regard to the pulse frequency, the filters used, and especially in the basic application of pulse time ratio modulation which is important in the present invention. In this invention pulse-time ratio modulation is primarily used to be able to record with unusually high accuracy a given signal of relatively low frequency. The problem of delay is of secondary importance since the recorded signal is played back delayed anyhow. This allows the use of much lower pulse rates than those encountered in electronic multiplication. This in turn necessitates changes from the circuit arrangement used in several electronic multipliers. While the possibility of electronic multiplication is mentioned mainly to point out the versatility of this recording method in comparison to other schemes, nevertheless the special types of multiplier circuits designed to overcome the specific difficulties encountered with these necessarily low pulse rates are believed to be novel and highly important for applications of this recorder to a large group of problems.

*Description of invention in intermediate terms*

This section is presented partly to give a more direct and detailed picture as a further illustration to the general description given above, and partly as a fairly detailed block diagram for an actual circuit which has been built primarily for laboratory tests and which will be described in all details below. In this section circuit arrangements are usually given their generic terms such as amplifier, integrator etc., if such circuits are considered to be generally known, and if the functioning of the entire circuit does not to a considerable extent depend on the particular realization of these operational circuits.

Figure 3:
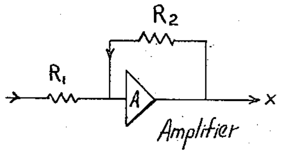
Figures 3, 4, 5, 6 and 7 show units of the block diagram shown in Figure 1.

In Figure 3, the "means of converting signal into voltage wave of suitable amplitude" (circuit 2 of Figure 1) is exemplified as an operational amplifier, similar to the ones used in electronic analog computers, if the signal itself is already a voltage wave. A high accuracy recorder deserves high accuracy intermediate components such as in this instance. "A" is a high gain D.C. amplifier with a feedback resistor $R_2$ and an input resistor $R_1$. The ratio $R_2/R_1$ is the actual amplification of the entire unit. This can easily be adjusted to be any reasonable amount. Ordinarily, the highest accuracy will be obtained without undue complications if the input signal amplitude range—if it is already a voltage wave as assumed here—is anywhere from about one volt to several hundred volts. If "unity" voltage is 100 volts—as will be assumed in this example case—then it is advisable for maximum utilization of accuracy and signal to noise ratio, to arrange that the output of circuit 2 of Figure 1 is also ranging between —100 and +100 volts.

Figure 2A:
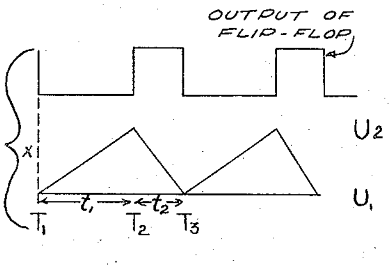
Figure 4:
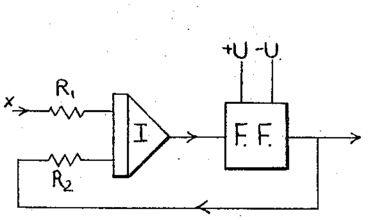

Figure 4 illustrates one possible circuit arrangement for circuit 3 of Figure 1. The input of the summer-integrator "I" is supplied through $R_1$ with the input voltage which shall be called "X," and through $R_2$ with a voltage derived from the "flip-flop" circuit, "F.F." This voltage from the output of the flip-flop, F.F., is either very closely 100 volts or very closely —100 volts, depending on the mode that the bistable flip-flop is in. Now, the mode of the flip-flop is controlled by the output of the integrator I in such a fashion that if the integrator output should become as low as a certain critical voltage $U_1$ (see Figure 2*a*), then the flip-flop output will change to —100 volts. If the integrator output should reach a certain other critical voltage $U_2>U_1$, then the flip-flop output voltage will change to +100 volts. The behavior of the circuit of Figure 4 can now be understood with the aid of Figures 2 and 2*a*. Assuming that the integrator output has just been at a voltage level $U_1$ and thereby caused the output of the flip-flop to be —100 volts the combined input current to the integrator will then be $-100/R_2+X/R_1$. It is necessary that this quantity be negative for all allowable values of X. If X is limited to values between —100 volts and +100 volts then a resistance ratio $R_2/R_1$ of ½ will automatically assure this necessary relation. Such a resistance ratio will correspond to a "modulation ratio" of 50%.

Since now the combined input current to the integrator is negative, the output voltage rises as follows (see Figure 2*a*):

$$U(t)=U_1+\alpha\int_{T_1}^{t}\left[100-\frac{1}{2}X(t)\right]dt \qquad (1)$$

where $\alpha$ is the rate of integration of the integrator, $R_2/R_1$ is assumed to be ½.

The output voltage will continue to rise until it reaches the critical value $U_2$. At this instant, the flip-flop suddenly changes its state and offers now a voltage of +100 volts to the integrator input. This not only puts a stop to the rise of the integrator output voltage but actually effects a decay of this voltage. The relation for the decay of the integrator output voltage is:

$$U(t)=U_2-\alpha\int_{T_2}^{t}\left[100+\frac{1}{2}X(t)\right]dt \qquad (2)$$

The integrator output voltage continues to drop, until the critical level $U_1$ is reached again. From then on, the integrator output voltage will rise again as before. Now, the following relations exist:

From $$(1):\quad U_2=U_1+\alpha\int_{T_1}^{T_2}\left[100-\frac{1}{2}X(t)\right]dt$$

$$(1^*)\qquad =U_1+\alpha(T_2-T_1)\left[100-\frac{1}{2}X(\tau_1)\right]$$

$$T_1\leq\tau_1\leq T_2$$

$\tau_1$ is value between adjacent numbered T (see above).

From $$(2):\quad U_1=U_2-\alpha\int_{T_2}^{T_3}\left[100+\frac{1}{2}X(t)\right]dt$$

$$(2^*)\qquad =U_2-\alpha(T_3-T_2)\left[100+\frac{1}{2}X(\tau_2)\right]$$

$$T_2\leq\tau_2\leq T_3$$

$\tau_2$ is value between adjacent numbered T (see above).

Hence from (1*) and (2*):

$$t_1\left[100-\frac{1}{2}X(\tau_1)\right]=t_2\left[100+\frac{1}{2}X(\tau_2)\right] \qquad t_1=T_2-T_1,\ t_2=T_3-T_2$$

$$\frac{t_1}{t_2}=\frac{100+\frac{1}{2}X(\tau_2)}{100-\frac{1}{2}X(\tau_1)}=\frac{100+\frac{1}{2}X(\tau_3)}{100-\frac{1}{2}X(\tau_3)}$$

$$T_1\leq\tau_1\leq\tau_3\leq\tau_2\leq\tau_3$$

$\tau_3$ is value between adjacent numbered *t* (see above)

$$\frac{X(\tau_3)}{200}=\frac{t_1-t_2}{t_1+t_2}=\frac{\left(\frac{t_1}{t_2}\right)-1}{\left(\frac{t_1}{t_2}\right)+1}$$

It is thus seen that the input voltage X at some point ($\tau_3$) interior to the interval under consideration is a function of the ratio $t_1/t_2$. It is also seen that this ratio is independent of the rate of integration $\alpha$, as well as $U_1$ and $U_2$. Of course, variations with time of these parameters would cause a change even in the times ratio $t_1/t_2$, but the change of times ratio $t_2/t_1$ depends only on the speed of these variations. The variation speeds of these parameters with time encountered in practice are so small that in this application these variations are of no objectionable consequence whatever. A simple calculation can be made to show that this behavior can be predicted from theory.

At this point is should be emphasized which factors will determine the ultimate accuracy of the modulator. These are: drift-rate of the integrator, accuracy and stability of the ratio $R_1/R_2$, stability of the output levels of the flip-flop. It can be seen, therefore, that the accuracy will not depend on the amount of drift of the integrator itself, but rather on the amount of rate of change of drift of the integrator. This very definitely alleviates the problem of drift-control for the integrator. In the same way, it is not necessary to have exactly +100 and −100 volts output levels of the flip-flop, just as long as these values will not change with time. The modulator may be looked upon as a means by which the voltage wave is continuously sampled a great many times a second in such a way that the ratio of the times between successive pulses is a function of the signal amplitude. Such continuous sampling provides pulse time ratios at successive increments which are functions of the voltage wave.

A different method for obtaining pulse time ratio modulation is shown in Figure 13*a*. A "sawtooth" generator produces waves of a triangular shape. The upward and downward slopes of this sawtooth wave must not of necessity be equal, but the average voltage of the sawtooth wave should be zero. A typical such sawtooth wave is shown in Figure 13. The signal wave X is now added to the sawtooth wave in the summer *Su* of Figure 13*a*. The resulting wave is no longer centered around zero volts as was the case with the wave of Figure 13. Instead, the time intervals $t_1$ and $t_2$ during which the output wave of the summer is below and above zero volts respectively bear the following relation to the signal voltage X (if X is constant):

$$\frac{X}{U}=\frac{t_1-t_2}{t_1+t_2}$$

where U is the peak value of the sawtooth voltage. For nonconstant signal voltage X a relation $$\frac{X(t)}{U}=\frac{t_1-t_2}{t_1+t_2}$$

can be shown to hold, where T is some instant during the time interval $t_1+t_2$. If one wishes to obtain a square wave whose "up" and "down" times are equal to $t_1$ and $t_2$ respectively, one merely has to pass the output of *Su* through a limiter amplifier LA. This amplifier is so designed that its output is either saturated positive or negative depending on whether the input is negative or positive respectively. The scheme of Figure 13*a* has the advantage that the sampling frequency is nearly independent of the amplitude of low frequency signals. Also modulation ratios approaching 100% are possible.

The sawtooth method for obtaining pulse time ratio modulation simplifies multichannel recording because the same sawtooth wave may be used on all channels. The summer and limiter may be combined into one circuit of relatively simple construction.

Multiplex recording may be obtained by the use of coders. E.g., a two channel multiplex recording system using the sawtooth method is shown in Figure 13*b*. The pulse time ratio modulated square waves are coded and then mixed in the mixer. Coding is essential because the mixed signals must be separated on playback. E.g., coding may consist of amplitude modulating a sinusoidal carrier by the square wave emerging from the output of the limiter amplifier, using different carrier frequencies for different channels. No crucial accuracy is required in these coders. The output of the mixer circuit is recorded. On playback, the reproduced signal is first passed through decoder circuits, one for each channel, which select the respective pulse-time ratio modulated signal from the mixed signal at the output of the recorder. For the type of coder mentioned above, the decoder should be a band pass filter with the carrier frequency of the respective channel lying in the center of the pass band, the pass band being as wide as possible without causing interference with other channels. After decoding, each channel has a demodulator which synthesizes the original signal at its output.

Figure 5:
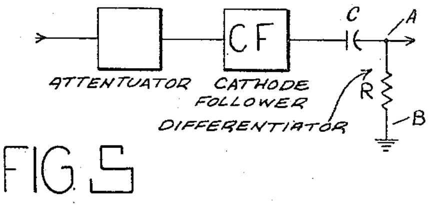

The circuits following the modulator Figure 4 are now of a non-critical nature. In Figure 5, e.g., is exemplified a representation of "means of producing sharply defined pulses from the pulse time ratio modulated signal" (circuit 4 of Figure 1). It can easily be seen that the output of the circuit of Figure 4 (curve (2), Figure 8*a*) is a sharply defined square wave of 200 volts peak-to-peak voltage. This square wave signal is attenuated to a more suitable level of perhaps 50 volts peak-to-peak in the simple attenuator, "Att." To obtain sufficient power and a low output impedance, the output of Att. is passed through a cathode follower "C.F." Now, the sharply defined pulses are derived from the output of C.F. by a suitable R–C differentiator circuit. The time constant should be adjusted to yield the desired shortness of the output pulses. It is also possible to deliver the output of the circuit in Figure 5 directly to the magnetic recording head. In that instance, the impedance of the recording head has to be considered in determining the time constant of the R–C divider. In any event, a signal of the same shape as that at the output of the circuit of Figure 5 is the one which will be recorded on magnetic tape. As already pointed out, the particular method of recording these pulses on the tape should be efficient primarily in producing sharply defined pulses in space dimension on the tape. For instance, connecting the recording head directly to the output of the circuit of Figure 5 is both simple and highly effective in the desired features. Needless to say, the amplitude of the recorded signal, in other words the magnetization, should be as high as possible to eliminate any possibility that tape noise will interfere with the reliability of operation on playback.

In some applications it might be more desirable to leave out circuit 4 of Figure 1 and record the output of circuit 3 of Figure 1 directly.

Figure 6:
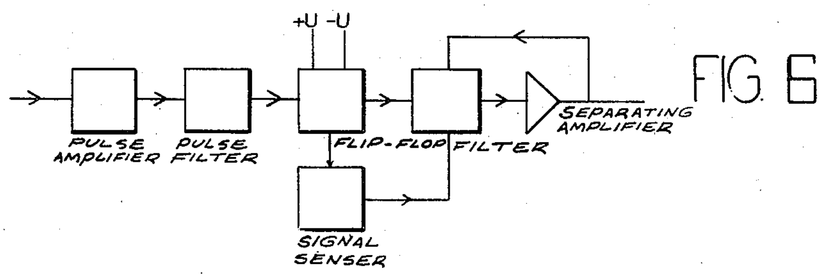

In Figure 6 the entire demodulator circuit is illustrated in form of a block diagram. "P.A." is the preamplifier which is used to amplify the weak pulses obtained at the output of the magnetic head on play-back. This preamplifier is sensitive primarily to the higher frequencies. To eliminate 60 cycle interference one should strive to make the 60 cycle amplification of P.A. very low. In a typical example, the output of P.A. will deliver pulses of approximately 10 volts magnitude.

The preamplifier is followed by a pulsefilter "P.F." This circuit is intended to eliminate high frequency pulses of low amplitude which may be due to tape noise or other interference and which might cause a spurious firing of the multivibrator circuit which is to follow. This pulse filter P.F. can be included in the triggering mechanism for the said multivibrator circuit. This was done in a circuit actually built as described below.

The pulses emerging from P.F. are now used to trigger the multivibrator flip-flop, "F.F." In particular, positive pulses will change the mode of F.F. so that the output will be +100 volts whereas negative pulses will change the output of F.F. to −100 volts providing a type of curve as (2) Figure 8*a*. If the time between a positive and the following negative pulse is denoted by $t_1$, and the time between this negative pulse and following positive pulse is denoted by $t_2$, (as was done in the analysis above), then the average voltage during the time interval $t_1+t_2$ is as follows:

$$V_{\text{ave.}}=100\frac{t_1-t_2}{t_1+t_2}$$

This average voltage is seen to be equal to the voltage $\frac{1}{2}X(\tau_3)$ which existed at some intermediate time $\tau_3$, in the time interval under consideration. Of course, a very high "noise"-voltage of 200 volts peak-to-peak magnitude is still superimposed on this desirable signal voltage. Although this seems very high—the noise is actually always bigger than the signal—one can nevertheless always reduce this noise to a level below 1/100 of one volt without affecting the signal, because the noise voltage consists of frequencies considerably higher than the signal frequencies. This is done in the circuit denoted by "F." This filter circuit F needs special consideration, because it has to have fairly sharp cut-off characteristics, and at the same time be as nearly free from overshoot and losses as possible. Sometimes, a lowpass filter built from L–C sections will be adequate. For extremely low cut-off frequencies one is better off using R–C filters whose characteristics are corrected by a suitable feedback loop from the output of the separating-amplifier A.

Both possibilities have been tried. The L–C filter however is restricted to use with a reasonably high cut-off frequency of at least a few cycles per second.

The output of the filter is then passed through one final amplifier whose main purpose it is to make the signal available at essentially zero ohms output impedance.

Figure 6 shows another circuit "S.S." which could be called "signal senser." This addition was found necessary to eliminate the annoyance caused by the fact that without any pulses delivered to the flip-flop e.g. when the tape was not moving, the flip-flop would remain at either +100 or −100 volts. Thus, without a "signal" coming in to the pulse-amplifier P.A. the output voltage of the demodulator was highly positive or negative beyond the limits that the signal voltage could ever reach. This was found to be undesirable in certain analog computer applications. In fact, one desired zero voltage output for the "no-signal" condition.

This was achieved by the signal senser circuit, S.S., also Figure 10, which is able to determine from the output of the flip-flop circuit almost instantaneously whether a signal is delivered to the preamplifier or not. In the no-signal case, the signal senser would quickly actuate a relay R*y*, Figure 10*a*, which would short out the input of the separating amplifier A. As soon as a new signal arrives at the preamplifier, the signal senser releases the relay and the signal can pass through the separating or output amplifier A.

Figure 7:
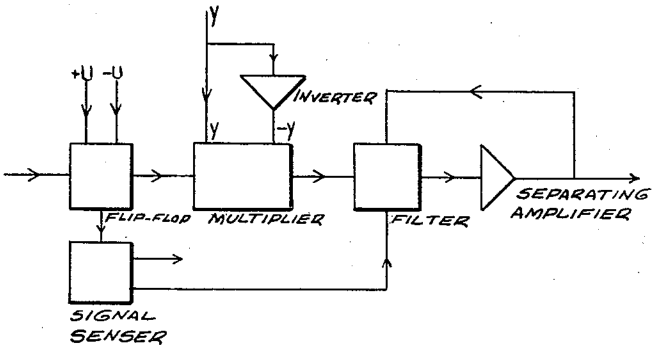

In Figure 7, an illustration is given of a possible arrangement for the immediate accurate electronic multiplication of the recorded signal X with another signal voltage Y. The circuit "M" is essentially a multivibrator, but instead of swinging between the fixed voltages +100 volt and −100 volt, as was the case with the flip-flop F.F., the multiplier M swings between the voltage +Y and −Y. Complications arise from the fact that Y can also assume negative values. These difficulties, however, can be overcome in various ways using rather elaborate limiter circuits. (See e.g. Figure 11 and description thereof below.)

The output signal of M is treated in exactly the same manner as the output signal of the flip-flop in Figure 6. In other words, the output of M is filtered, controlled by the signal senser S.S., and then passed through a separating amplifier A'.

It should be noted that the only addition necessary for electronic multiplication is the multiplier circuit M. If only one multiplication of X is desired, M and F.F. can be combined into one circuit.

In the following section some circuit aspects of an actually built circuit will be discussed. This model circuit has a block diagram very nearly identical to that given in Figures 3 to 7. The entire block diagram is given in Figure 8, wherein curve *d* represents the typical wave form at the output of flip-flop of the modulator circuit, curve *e* the form of pulses at the recording head and curve *f*, the pulses at the input of the pulse amplifier.

*Comments on the detailed diagram of actual circuit*

A model recorder system using pulse time ratio modulation has been constructed for testing its usefulness in analog computer applications. The demands on accuracy and stability in this application are especially high, whereas no high frequency response is necessary because certain analog computer components (servo multipliers) are limited to signal frequencies below one cycle per second. Therefore, this model recorder was designed specifically for low frequency signal applications. However, there seems to be no inherent limitation of pulse time ratio modulation recording to such low frequencies. It appears entirely feasible to utilise time ratio modulation recording for high accuracy recording of signals containing frequency components considerably higher than one cycle per second.

*Modulator circuit.*—Figure 8 gives a block diagram of the circuit which is given in all details in Figures 9 and 10. In Figure 8*a* curve (1) represents a signal which is desired to be recorded, which may be a periodic or aperiodic signal. Curve (2) is a wave form derived from curve (1) by the applications of pulse time ratio modulation and is the continuous sampling wave at the output of the multivibrator of the modulator (Figure 4), circuit 3, (Figure 1) and *d* Figure 8. Curve (3) shows enlarged portions of curve (2). Curve (4) indicates the current pulses applied to the recording head corresponding to the elements of curve (3), see *e* of Figure 8. Curve (5) shows the pulses of curve (4) when played back, see *f* of Figure 8. Curve (6) shows the triggering portion of the pulses of curve (5) which corresponds to the points on curve (2) where the modes abruptly change indicating the sharpness and accuracy of location of the reversals in curve (2). The output of the multivibrator of the demodulator circuit 7 (Figure 1) and Figures 8 and 10 looks on play back like curve (2). The average voltage of curve (2) which is obtained by passing the wave of curve (2) through a low pass filter is then the original signal shown in curve (1).

The integrator 1, Figure 9 consists of tubes $T_{1a}$ and $T_{1b}$, $T_{2a}$ and $T_{2b}$, and $T_3$. The different gain inputs *x*1, *x*4, and *x*20 are effected by suitable input resistors $R_1$ to $R_3$. The integrating capacitor is $C_2$. Appropriate controls $R_5$ to $R_9$ in the D.C. amplifier portion of the integrator allow respectively adjustment of "zero," "balance," and "compensation." $C_1$ and $R_{23}$ suppress oscillations of the high gain feedback amplifier of I. In this simple form, the integrator has no automatic balancing control. Such a circuit, however, could easily be added to the integrator.

The flip-flop consists of Tubes $T_4$, $T_{5a}$ and $T_{5b}$, and $T_6$. $T_{5a}$ and $T_{5b}$, called as a unit $T_5$, may be a single tube forming a bistable multivibrator. The firing of this multivibrator is controlled by the integrator over the resistor $R_{27}$. The swing of the integrator output voltage is approximately 200 volts. $T_4$ and $T_6$ control the plate voltages of the two sections of $T_5$ to be either +100 or −100 volts. Any error caused by the nonzero forward resistance of these diodes $T_{5a}$ and $T_{5b}$ (which usually results in a constant error in the final output voltage) can be eliminated with the zero adjustment, as long as the error is consistant which is usually the case. The output of the flip-flop is fed back over $R_{34}$ to the grid of the integrator input tube $T_1$. It also feeds over the divider $R_{35}$, $R_{36}$ to the grid of the cathode follower $T_7$.

The output of the cathode follower feeds through the differentiator $C_3R_{39}$ to the recording head.

$T_{8a}$ and $T_{8b}$ are the erase oscillator tubes. The output of the oscillator feeds to the erase head.

The relay Ry, Figure 9, controls "record-playback." On "record," the low end of the oscillator tank circuit is grounded which makes the erase circuit oscillate. On "playback," the oscillator is quenched by biasing the oscillator with a strong negative voltage. The operation of the modulator circuit is suppressed by grounding the output of the integrator over a small resistor. The input of the pulse amplifier is connected to the playback head.

The relay, Ry, Figure 9, is ordinarily controlled by a switch, $S_1$. However, for applications in automatic computing, the relay can also be controlled by a suitable relay amplifier of the computer.

*Demodulator circuit (Fig. 10).*—The first part of the demodulator circuit is a two-stage amplifier with a total gain of approximately 1000. The coupling networks have a fairly short time constant of the order of a millisecond. This makes the amplification of 60 cycles "pick-up" noise signals low. Figure 8 in curves *d*, *e* and *f* shows the approximate shape of the pulses at various points in the recorder. The output of the modulator curve consists of pulses which rise almost instantaneously and then decay very shortly thereafter. The magnetization on the tape, however, does not rise abruptly since it takes time until the inductance of the recording head reached its maximum current. An additional spreading of the magnetization pulse is brought about by the finite width of the gap of the recording head. This is shown in curve *f*. During playback, the magnetization pulse is now differentiated since the output voltage of the playback head depends on the rate of change of flux in the gap. The steepest portion of this is seen from the figure to lie in the middle of the N-shaped pulse curve *f* or as indicated more fully in curve (6) of Figure 8*a*. This portion of the pulse is then used to fire the flip-flop of the demodulator.

Before these pulses are used to fire the flip-flop, they are sent through a phase splitter, see Figure 10, which delivers equal but opposite pulses to a selective triggering circuit shown in detail in Figure 10*b*. The selective triggering circuit acts as a pulse filter (Figure 6) and consists of two diodes $T'_{4a}$ and $T'_{4b}$ whose plates are connected to the grids of the two triodes $T'_{5a}$ and $T'_{5b}$ comprising a regular bistable multivibrator. The diode-cathodes are biased from resistance dividers $R'_{17}$ and $R'_{15}$, and $R'_{16}$ and $R'_{18}$ connected from the plates of the triodes to the minus potential as shown in Figures 10 and 10*b*. The resistance dividers are chosen in such a way that the cathode potential of the diode which is next to the saturated triode is slightly positive by an amount $\Delta e$. $\Delta e$ should be appreciably larger than the expected noise voltage in the trigger pulse stream and should be much less than the magnitude of the peak-to-peak trigger pulse voltage. The trigger voltage is applied in push-pull through two capacitors $C'_4$ and $C'_5$ connected to the diode cathodes. The identical time constants $C'_4R'$ and $C'_5R'$ where $R'$ is the effective impedance from the diode cathode to ground, are made short compared with the long leading and trailing edges of the triggering pulses, but at the same time $C'_4R'$ and $C'_5R'$ are made large compared with the time of the steep middle portion S*p* of the triggering pulses.

The insertion of the diodes obviously insures that only negative portions of pulses are effective in triggering. Figure 10*c* shows a typical triggering pulse. The irregular region A*r* in the vicinity of zero volts which is due to noise is ineffective in triggering on account of the smallness of this noise compared to the bias voltage $\Delta e$. The first and last part of each triggering pulse *tp* appears attenuated at the diode cathode due to the smallness of the time constant RC compared with the rise time of these portions.

By proper choice of component values, it can be arranged that the attenuation is so great that the resulting voltage at the diode cathode is less than $\Delta e$ and, therefore, always insufficient for triggering. Thus, only the steep middle portion, which passes through to the diode cathode almost unattenuated, is capable of triggering the flip-flop. Typical wave shapes at the cathode and the plate of a diode are shown in Figures 10*d* and 10*c* respectively.

$T'_6$ and $T'_7$ again limit the plate voltages of the flip-flop to +100 and −100 volts. The plate voltage at $T'_{5b}$ is now the same as the plate voltage that existed at $T'_{5b}$ of the modulator circuit during "record." This signal is then passed through a four section, $R'_{25}$ to $R'_{29}$ and $C'_8$ to $C'_{11}$ R–C filter to the input of $T'_{8c}$ and $T'_{8b}$. $T'_{8a}$ and $T'_{8b}$, $T'_{9a}$ and $T'_{9b}$, and $T'_{10}$ comprise the separating amplifier. The feedback consists of a D.C. path to adjust the desired gain and an A.C. path to correct for the slight attenuation of the R–C filter at even very low frequencies as labelled in Figure 10. With the components shown, the frequency response was flat to 0.1 cycle per second, was flat within 1% to slightly beyond one cycle per second, then dropped off very sharply to a negligible amount beyond ten cycle per second. The D.C. gain can be chosen either *x* or *x*1/10. The coarse and fine balance adjustment of the output amplifier is effected by $R'_{32}$ and $R'_{31}$ respectively.

The signal senser circuit consists of a tube $T'_{11}$ with a relay $R'_y$ in the plate circuit. The grid is connected to B+ by the large resistor $R'_{62}$ so as to cause a current flow through it of magnitude $e_B/R$ where R is the value in ohms of this resistance. If a stream of pulses of predetermined height and spacing is applied to the grid over a capacitor $C'_{16}$ from a low impedance source, the capacitor will charge up through the grid for positive pulses and the grid voltage will subsequently drop as shown in Figure 10*a*. It will then slowly rise due to the current flow through the resistor $R_{62}$. The rate of rise is about $$\frac{d_{eg}}{d_t}=\frac{1_r}{C}\approx\frac{e_B}{R.C.}$$

If $e_p$ is the positive voltage of the pulse, then the time required for $e_g$ to reach zero again is about $$t\approx\frac{e_p\cdot RC}{e_B}$$

If the period between pulses is appreciably less than *t* for all "regular" pulse streams, then the tube $T'_{11}$ will be saturated only for the relatively short pulse time of each positive pulse. As a result, the relay $R'_y$ will remain deenergized. If, however, the pulse stream breaks off, the resistor $R'_{62}$ will almost immediately discharge the capacitor $C'_{16}$ and cause the tube to be saturated. Thus, the relay will be energized as soon as the regular pulse stream is interrupted. The relay contact arrangement can now be used to avoid undesirable operation anywhere in the pulse system which would normally result from the absence of a regular pulse stream.

If a new signal comes into the demodulator, it will cause (indirectly) the current through the relay to drop below a level sufficient to hold the relay pulled. This then opens the input of the separating amplifier again and lets the desired signal pass through to the output.

The multiplier consists of 8 diodes $D_1$ to $D_8$ inclusive arranged as shown in Figure 11. The input leads are supplied with opposite time-ratio modulated square waves of sufficient voltage. The time ratio modulation is obtained from an original signal X. Another signal voltage Y, intended to multiply X, is supplied push-pull to the leads marked "Y" and "—Y." The capacitors and resistors connected to each diode branch effect an equalization of the diode currents independent of the magnitude or sign of Y. It can be seen that the output lead is either at Y volts or —Y volts, depending on the mode of the time-ratio modulated input square wave. The average value of this output voltage, averaged over one complete cycle is, therefore, $$\frac{t_1Y+t_2(-Y)}{t_1+t_2}$$

where $t_1$ and $t_2$ are the "up" and "down" time intervals of the square wave. Now it is known that $$\frac{t_1-t_2}{t_1+t_2}=\frac{X}{U}$$

and, therefore, $$\frac{t_1Y-t_2Y}{t_1+t_2}=\frac{X\cdot Y}{U}$$

Subsequent filtering of the "sampling" frequencies makes $X.Y/U$ available. This circuit shows considerable independence from tube characteristics and, therefore, a high degree of linearity and accuracy.

In the above circuits, the accuracy and frequency response of the modulator and demodulator circuit may be improved if a reasonable amount of feedback is applied as shown in Figure 12. During the process of recording a signal voltage X the demodulator is connected directly to the modulator output by means of a switch, yielding a voltage —X′ at the domodulator output. X′ will be approximately equal to X. Instead of feeding the signal voltage directly to the modulator circuit, one applies the sum of the signal voltage X and the output voltage of the demodulator circuit —X′ over a medium gain D.C. amplifier $A_m$ to the input of the modulator. This feedback arrangement is not restricted in its usefullness to time ratio modulation recording, but is applicable in all recording schemes where the recording mechanism, the recording heads and the magnetic tape do not introduce any appreciable error.

Having now described my invention I claim:

1. A method of recording and reproducing electrical waves which comprises continuously sampling the waves at a rate at least twice as great as the highest signal frequency component desired to be reproduced, producing by the sampled increments abrupt changing voltage modes such that successive time intervals defined by these abrupt changes of mode bear the following functional relation to the input signal $$\frac{X}{U}=\frac{t_1-t_2}{t_1+t_2}$$

wherein U is unity voltage, an arbitrary voltage used as a reference, X is the voltage of the input and $t_1$ and $t_2$ define successive time intervals where the mode changes, then producing thereby short sharply defined pulses at points of said abrupt changes, magnetically recording said pulses, and thereafter reproducing said recording and synthesizing the original signal.

2. A method of recording and reproducing electrical waves which comprises continuously sampling the waves, producing by the sampled increments abrupt changing voltage modes such that successive time intervals defined by these abrupt changes of mode bear the following functional relation to the input signal $$\frac{X}{U}=\frac{t_1-t_2}{t_1+t_2}$$

wherein U is unity voltage, an arbitrary voltage used as a reference, X is the voltage of the input and $t_1$ and $t_2$ define successive time intervals where the mode changes, then continuously magnetically recording said abrupt changes and thereafter reproducing said recording and synthesizing the desired function of the original signal.

3. A method of recording and reproducing electrical waves which comprises continuously sampling the waves, producing by the sampled increments abrupt changing voltage modes such that successive time intervals defined by these abrupt changes of mode bear the following functional relation to the input signal $$\frac{X}{U}=\frac{t_1-t_2}{t_1+t_2}$$

wherein U is unity voltage, an arbitrary voltage used as a reference, X is the voltage of the input and $t_1$ and $t_2$ define successive time intervals where the mode changes, then producing thereby short sharply defined pulses at points of said abrupt changes, magnetically recording said pulses, thereafter reproducing said recording and synthesizing the original signal.

4. The method of recording and reproducing electrical waves which comprises continuously sampling the signal wave, producing by the sampled increments abrupt changing voltage modes such that successive time intervals defined by these abrupt changes of mode bear the following functional relation to the input signal $$\frac{X}{U}=\frac{t_1-t_2}{t_1+t_2}$$

wherein U is unity voltage, an arbitrary voltage used as a reference, X is the voltage of the input and $t_1$ and $t_2$ define successive time intervals where the mode changes, then producing thereby short sharply defined pulses at points of said abrupt changes, magnetically recording said pulses, thereafter reproducing said recorded signal, demodulating the same including filtering and producing a synthesized signal as a function of the original signal.

5. The method of recording and reproducing electrical waves which comprises continuously sampling the signal wave a large number of times per cycle and converting the same into sharp pulses such that the ratio of the difference to the sum of successive time intervals between pulses is a function of the input signal and magnetically recording the pulses so produced.

6. The method of producing a product of two electrical waves occurring at different time positions which comprises continuously sampling the earlier occurring electrical wave a large number of times per cycle and converting the same into sharp pulses such that the ratio of the difference to the sum of successive time intervals between pulses is a function of the input signal, magnetically recording the pulses so produced, reproducing the pulses at the time of the occurrence of the second wave, converting said pulses to corresponding square topped waves and multiplying the same in an electrical mixing circuit.

7. The method of producing a product of two electrical waves occurring at different time positions which comprises continuously sampling the earlier occurring electrical wave converting the same into a pulse-time-ratio modulated square wave, recording the same, reproducing the same at the time of the occurrence of the second wave and multiplying said squared wave with said second wave and thereafter filtering the product of the squared wave and the second wave in order to obtain the output of the first and second wave.

8. In a system for recording and reproducing an electrical signal, means for continuously sampling said electrical signal with positive and negative voltages a great many times a second in such a way that the ratio of times between successive voltage pulses is a function of the amplitude of the signal, means connected to the output of the sampling means for producing sharp pulses, means for recording the output of said last named means and demodulator means responsive only to the ratio of times defined by said successive pulses.

9. A system for recording a signal wave comprising means for modulating opposite substantially square topped wave modes with the signal wave such that successive wave mode changes establish time ratios as a function of the signal wave, means for converting the output of said modulating means to corresponding sharp pulse waves, means for recording said sharp pulse waves as a source for synthesizing the original wave and demodulator means responsive only to the ratio of times defined by said successive pulse waves.

10. A system for recording a signal wave comprising means for modulating opposite substantially square topped wave modes with the signal wave such that successive wave mode changes establish time ratios as a function of the signal wave, means for recording the modulated modes as a source for synthesizing the original signal and demodulator means responsive only to the ratio of successive modes.

11. A system for recording a signal wave comprising an amplifier having a controlled output, electrical circuit means, an integrator connected to the output of the amplifier and the output of said electrical circuit means for integrating both the signal received from the amplifier and another signal fed back from said electrical circuit means, said electrical circuit means providing two square topped opposing wave modes adapted to change abruptly from one to another dependent upon the input signal impressed thereon, the input of said circuit means connected to the output of said integrator, a recorder, and means connecting the output of said circuit means to said recorder to record a signal representative of the instantaneous ratio of said opposing wave modes.

12. A system for producing pulse-time-ratio modulation comprising a signal input means, an electric integrator circuit connected to said input means, a bi-stable electric multivibrator circuit connected to the integrator circuit and controlled thereby with said multi-vibrator having an output, means connecting the output of said multivibrator circuit in feed back relation to the input of the integrator, said connecting means including means for combining the output of the multivibrator with the signal input to establish pulse time ratio modulation and means providing an output of the system through which said modulation is fed.

13. A system for recording a signal wave comprising an amplifier having a controlled output, circuit means providing a feed back signal having two square top opposing wave modes adapted to change abruptly from one to another dependent upon tis input signal, an integrator connected to the output of the amplifier for integrating both the signal received from the amplifier and said feedback signal of said circuit means, the input of said circuit means connected to the output of said integrator, an attenuator connected to said circuit means, a cathode follower connected to said attenuator and a recorder operatively connected to said cathode follower.

14. A system for recording and reproducing a signal wave which comprises means for modulating opposite substantially square topped wave modes with the signal wave such that successive mode changes establish time ratios as a function of the signal wave, means for converting the output of said modulating means to corresponding sharp pulse waves, means for recording said sharp pulse waves as a source for synthesizing the original wave, in combination with means for synthesizing said signal comprising a demodulator operatively connected to said recorder for producing from impressed sharp pulse waves square wave forms having opposing modes, a filter and separating amplifier connected in cascade with said demodulator.

15. In a pulse system means for accurately determining the position in time of a positive or negative pulse, comprising means for producing essentially the derivative of the pulse which will have positive and negative parts joined by a steep middle portion, and means responsive to sign, magnitude and steepness of said middle portion, comprising a bi-stable multivibrator circuit having triode tubes and diodes connected to the grids of said triodes, resistance dividers connected to the diodes to provide proper biasing potentials to these diodes, a push pull triggering source connected through capacitors to the biased diodes, such that the time constant of the capacitor-resistance divider arrangement is longer than the time interval of the steep middle portion but shorter than the portions of the pulse adjacent to the ends of the middle portion.

References Cited in the file of this patent

UNITED STATES PATENTS

| | | |
|---|---|---|
| 2,432,204 | Miller | Dec. 9, 1947 |
| 2,468,058 | Grieg | Apr. 26, 1949 |
| 2,470,028 | Gordon | May 10, 1949 |
| 2,498,678 | Grieg | Feb. 28, 1950 |
| 2,543,736 | Trevor | Feb. 27, 1951 |
| 2,629,857 | Deloraine et al. | Feb. 24, 1953 |
| 2,676,202 | Filipowsky | Apr. 20, 1954 |
| 2,724,740 | Cutler | Nov. 22, 1955 |
| 2,744,959 | Greefkes et al. | May 8, 1956 |
| 2,756,404 | Anderson et al. | July 24, 1956 |

OTHER REFERENCES

"Tele-Tech" magazine for August 1954, pp. 94, 95, and 173–177.